United States Patent Office 2,763,371
Patented Sept. 18, 1956

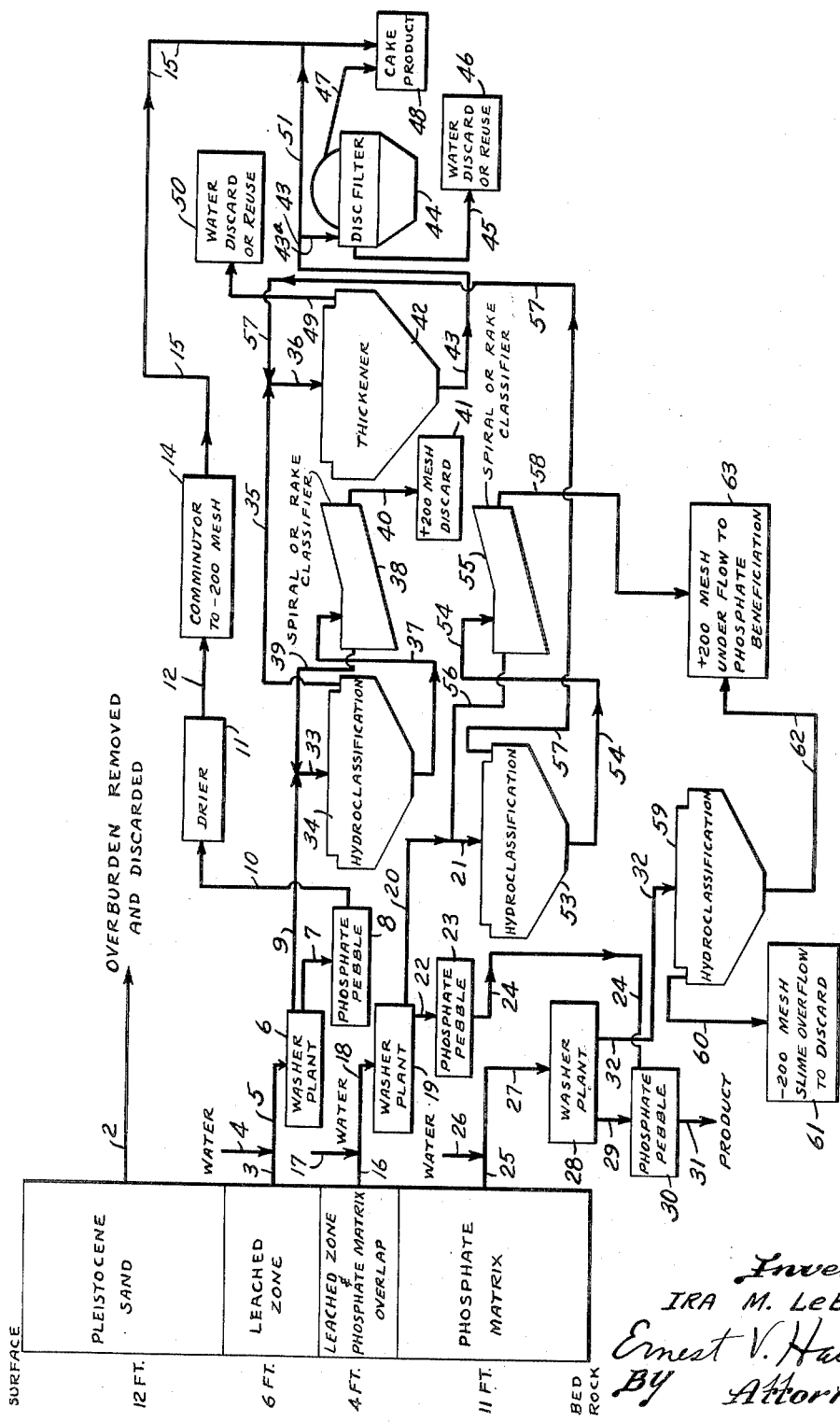

2,763,371

ORE DRESSING PROCESS

Ira Milton Le Baron, Evanston, Ill., assignor, by mesne assignments, to the United States of America as represented by the United States Atomic Energy Commission Application June 10, 1952, Serial No. 292,709

7 Claims. (Cl. 209—12)

The present invention relates to a process of recovering certain fractions of the leached zone contained in association with the Florida pebble phosphate matrix found mainly in Polk County, Florida, with small deposits also being found in Hillsborough and Hardy Counies, Florida. The leached zone which lies above the mineable phosphate matrix and below the Pleistocene sand overburden is less phosphatic than the matrix with much of the calcium phosphate having been removed through the ages by leaching. The thickness of the leached zone presently discarded in the mining of the phosphate matrix, averages about five or six feet.

Mineralogical studies indicate that the so-called leached zone is chemically identified as a mixture of hydrated aluminum phosphate, calcium aluminum phosphate, and fine quartz clay with some unleached and partially leached calcium phosphate pebble contained particularly in the lower section of the leached zone. Preliminary examinations of the leached zone indicate that there are major crystal phases of quartz wavellite and perhaps pseudo-wavellite with major phases of feldspar, fluorapatite, kaolinite and heavy minerals such as zircon and rutile.

In the mining of the phosphate matrix presently on a commercial scale, the Pleistocene sand and the leached zone are first removed as overburden and discarded. The matrix which constitutes about 11 feet in depth is then mined and slurried with water in a washer pit after which the slurry is passed to the washer plant to undergo processing to remove the so-called pebble phosphate for sale and to recover from the further smaller fractions the feed used for flotation to produce a phosphate flotation concentrate.

It has now been discovered that certain fractions of the leached zone material are particularly useful as feed material for the recovery of aluminum values, phosphorus values and uranium values. Additionally, it has been discovered that the uranium values are not homogeneously distributed throughout the particles of the leached zone, but that between about 70% and 80% of the leached zone material constitutes plus 200 mesh fractions, the majority of which is silica. The minus 200 mesh material has been found to contain varying amounts of uranium as well as phosphorus and aluminum values, while the plus 200 mesh material has been found to contain relatively small amounts of uranium, practically no aluminum and less than 50% of phosphorus values present in the original leached zone material. The leached zone material has been found to have the following typical analysis:

| Leached Zone Material | $P_2O_5$ | CaO | $Al_2O_3$ | Insoluble | $U_3O_8$ |
|---|---|---|---|---|---|
| | Percent | Percent | Percent | Percent | Percent |
| Head | 8.69 | 6.37 | 8.68 | 68.72 | .0144 |
| Plus 200 Mesh | 5.44 | 5.53 | 1.68 | 83.08 | .0053 |
| Minus 200 Mesh | 14.68 | 9.19 | 25.34 | 38.56 | .0299 |

The above table shows analyses constituting typical or average ones for leached zone material of Polk County, Florida. However, these percentages can and do vary considerably from one area to another. For example, in the minus 200 mesh fraction the variations are as follows: $P_2O_5$, from 8 to 25%; CaO, from 2 to 20%; $Al_2O_3$, from 35 to 15%; insoluble, from 38 to 50%; $U_3O_8$, from 0.01 to 0.07% or more.

The ore dressing of the various materials found in this area is shown in the accompanying flow sheet in diagrammatic form. The top twelve feet of Pleistocene sand is removed as overburden and discarded. The leached zone constitutes the next six feet which is separately processed to recover the minus 200 mesh material. The next four feet below that constitute a mixed ore overlap or transition zone in which leached zone material and phosphate matrix are intermingled. This zone is frequently mined in present pebble and beneficiation operations. This is processed to recover the plus 200 mesh material, the phosphate pebble and the minus 200 mesh material. The next eleven feet below that constitute what is known as the phosphate matrix from which phosphate pebble is recovered as well as the plus 200 mesh underflow material. The minus 200 mesh material constitutes slimes which are discarded.

Referring now more specifically to the accompanying drawings, the lefthand side shows the relative amounts and position of the various layers of the Polk County phosphate beds together with the overburden associated therewith. Line 2 shows that the Pleistocene sand is removed and discarded. Leached zone 3 has added thereto water 4 and the slurry is conducted by means of line 5 (which could be a belt conveyor if water is subsequently added) to a conventional washer plant 6 from which there is separated by means of line 7 phosphate pebble 8 which is conducted by means of line 10 to dryer 11 where the moisture content is reduced down to a figure of about five to ten percent and the dried material conducted by means of line 12 into a suitable comminution apparatus 14 where the vast majority of this dried phosphate pebble is ground to a size which will pass a 200 standard mesh screen. This material is conducted by means of line 15 to join a product cake 48 whose manufacture and isolation will be subsequently described.

The slurry from washer plant 6 is conducted by means of line 9 and line 33 into a hydroclassifier 34. In this hydroclassifier, or hydroseparator, a crude or rough separation is made between the large particle material and the fine particle material, the large particle passing as underflow by means of line 37 in closed circuit with a spiral or rake classifier or bowl desiltor 38. The fine overflow from this classification is conducted by means of lines 39 and 33 back to the hydroclassifier 34, where the raked product or spiraled product is conducted by means of line 40 to container or discharge 41. This constitutes material which is generally larger than 200 mesh and is principally silica particles. This is discarded. The fine particle overflow from classifier 34 is conducted by means of lines 35 and 36 to thickener 42. The overflow from thickener 42 is conducted by means of line 49 to a storage tank or to discard. The water 50, is either re-used in this system or discarded permanently. The underflow from thickener 42 constitutes a slurry having about 16 to 20 percent solids and constituting largely minus 200 mesh material. This is conducted by means of lines 43 and 43a to disc filter 44. The invention is not limited to the use of disc filter 44. Any other suitable filtering device or device for separating liquids from solids may be employed, for example a cyclone separator, a drum filter, centrifuge or an evaporator could be employed in place of disc filter 44. A cake is removed from the discs of the filter as shown at line 47. This constitutes largely minus 200 mesh material and is at about 60 percent solids, the balance being water. It is combined as a cake product in 48 with the previously described dried, ground pebble from the washer plant. The water removed by means of line 49 may be joined with the water in container 50 and reused in the system, or it may be discarded as shown at 46. If the thickener 42 is so operated as to give an underflow slurry up to about 30% solids, depending upon the subsequent processing of the underflow, the solid-liquid separation device 44 may be eliminated altogether in which case the underflow 43 may be either directly combined with the dried comminuted material in line 15 or it may be separately processed to recover its uranium, phosphorus and aluminum values by subsequent chemical treatments.

Disc filter or other liquid-solid separation device 44 may be by-passed entirely. The underflow from thickener 42 may be conducted by means of lines 43 and 51 directly to line 15 where it joins and is admixed with the phosphate pebble which has been comminuted to about —200 mesh. The resultant slurry is then subjected to chemical treatment to recover its $P_2O_5$, $Al_2O_3$ and $U_3O_8$ values. In carrying out this modification of the process, drier 11 may be omitted entirely or it may be used to only partially remove water prior to the comminution step 14.

The material or cake product 48 contains about 14.68% $P_2O_5$, about 9.19% CaO, about 25.34% $Al_2O_3$, about 38.56% insolubles and about .03% $U_3O_8$ on a dry basis. The discard material 41, is practically all silica although there are minor amounts of $P_2O_5$ and $Al_2O_3$ contained therein. The overflow slurry from hydroseparator 34 which is conducted to thickener 42 by means of lines 35 and 36 is usually between 4 and 6% solids, that is the rate of through-put in hydroseparator 34 is such that the overflow product will contain about 4 and about 6% solid material. In general the material entering disc filter 44 by means of line 43 has poor filtration characteristics since the material is extremely fine and is somewhat compressable. Usually however, the filter 44 is operated so that the cake is about 1/32 of an inch thick and will contain about 60% solids. One aid in filtering this material is to employ increased temperatures of say 75 to 120° F. and to use a higher percent solids in the feed or flocculation procedures to give increased filtration rates. The use of increased temperatures however is expensive so therefore the better expedient is to vary the percent solids from the thickener 42 to give as high a percent as possible, although the slurry content of line 43 may be satisfactory for operation of the disc filter if the percent solids is about 15%. The disc filter 44 works better and more efficiently if the percent solids is closer to 20%.

Filter rates in the disc filter of about 4.1 pounds of dry solids per square foot of filter area per hour are obtained using a slurry feed of about 20% solids. If a slurry feed to the disc filter is obtainable by increasing the thickener area, this would be desirable from the standpoint of operating the filter for removal of the water from the slurry.

Material from the overlap or transition leached zone and phosphate matrix is conducted by means of line 16 with a slurry of water, line 17, and by means of line 18 into a conventional washer plant 19, and from this washer plant a phosphate pebble is obtained through line 22 for intermediate phosphate pebble storage at 23. The slurry material from the washer plant and which constitutes minus 1 millimeter in particle size is then conducted by means of lines 20 and 21 to the hydroseparator 53. The underflow material is conducted by means of line 54 in closed circuit with a spiral or rake classifier 55, the overflow from this classifier being returned by means of lines 56 and 21 to the hydroseparator 53, and the raked or spiraled product which constitutes plus 200 mesh material is conducted by means of line 58 to storage tank or other container 63.

The overflow from hydroseparator 53 which constitutes the minus 200 mesh material is conducted by means of lines 57 and 36 to the thickener 42, previously described.

Phosphate matrix is slurried with water introduced through line 26 and is conducted by means of lines 25 and 27 to a conventional washer plant 28, from which plant phosphate pebble is delivered through conduit 29 to a storage bin or hopper 30. The phosphate pebble from washer plant 19 and contained in storage tank 23 is conducted or combined with the product from washer plant 28 by means of line 24, the combined product at 30 being then removed from the system by means of line 31 and sold in commerce as Florida phosphate pebble. The overflow or slurry from washer plant 28 is conducted by means of line 32 to the conventional hydroclassification operations of the Florida phosphate plant, which is represented by the hydroseparator 59. Overflow from the hydroseparator 59 is conducted by means of line 60 to a slime pond for discard. This represents minus 200 mesh material and at present is not considered economical to further process. The underflow from hydroseparator 59 is conducted by means of line 62 to join with the raked product from spiral or rake classifier 55 through line 58 to a combination or combined storage facility 63 from which it is removed and further processed to recover the conventional flotation phosphate concentrate.

The cake product 48 contains commercially valuable quantities of $P_2O_5$, $Al_2O_3$ and $U_3O_8$. This material being commercially useful as a raw material is then processed for the recovery of these three, or at least one of these three valuable components.

The plus 14 mesh material recovered at 23 differs chemically to a considerable extent from the plus 14 mesh material recovered at 30. The former is considerably higher in iron and alumina impurity content. At times, it is therefore desirable to separately collect these two pebble products instead of combining the two as shown in the accompanying drawing (line 24). The pebble produced from the phosphate matrix is therefore an excellent starting raw material for the manufacture of ortho phosphoric acid while that recovered from the transition or overlap zone is much less desirable for this purpose, due to its high impurity content. So far as uranium content is concerned, pebble from both sources is relatively high at least in comparison with phosphate flotation concentrates obtained from those two zone sources. Therefore, uranium is advantageously extracted from both pebble products at some subsequent treatment step of those two types of phosphate pebble, regardless of whether or not the pebble products are processed separately or combined prior to processing. In addition to the above criteria for selectively mining the transition and matrix zones, the fine particled portions visually exhibit different settling characteristics, the overlap portion having characteristics similar to the leached zone fine particles while the fines from the matrix have extremely poor settling and filtering characteristics. The fine particles (minus 150 or up to minus 200 mesh) from the matrix have not substantially settled after five years of undisturbed standing while the same size particles from the transition zone are settled to the same extent in a few hours.

It is of course apparent that while the flow sheets represented by the drawing have been described with reference to a separation between minus 200 mesh material and plus 200 mesh material the process of the present invention may be practiced employing splits other than at 200 mesh, although the recovery of the uranium values will not be as efficient. In other words, if the hydroclassifier and thickeners are operated at a through-put with a settling area other than that described heretofore, so that a mesh split is made at 150 or at say 220, a cake product at 48 will be obtained which is commercially valuable for further processing. However, the percentage of uranium contained therein calculated as $U_3O_8$ will not be optimum, it having been discovered that for the particular material being processed a split at 200 mesh gives optimum recoveries of $U_3O_8$ consistent with economical use of equipment employed to obtain such a fraction from the raw material. The process of the present invention is based on the discovery that the finer fractions i. e., the fractions containing the finer particles contain the greatest portion of the uranium values, while the larger fractions, that is the particles containing the larger sized material contain practically no uranium values, these being largely silica particles.

Having now thus fully described and illustrated the character of the present invention what is desired to be secured by Letters Patent is:

1. A process of beneficiating the leached zone portion of the overburden of Florida pebble phosphate matrix which comprises slurrying said leached zone material with water, separating the pebble from the slurry, subjecting the pebble-free slurry to hydroclassification to separate a large particle fraction as a slurry underflow and a small particle fraction as a slurry overflow whose particles are smaller than about 200 mesh, recovering the solids content of the small particle overflow fraction, drying the phosphate pebble, comminuting the dried pebble to substantially the same particle size as that of the slurry overflow particles and combining the comminuted dried pebble with recovered solids of the slurry overflow.

2. A process as in claim 1 wherein the solids of the slurry overflow and the comminuted pebble are smaller than between about 150 and 220 mesh.

3. A process of beneficiating the leached zone portion and the overlap leached zone-phosphate matrix portion of the overburden of Florida pebble phosphate matrix which comprises separately slurrying these two portions with water, separately separating the pebble from each of these two portions, separately subjecting each pebble-free slurry to hydroclassification to separate a large particle fraction as a slurry underflow and a small particle fraction as a slurry overflow whose particles are smaller than about 200 mesh, combining the two small particle fractions and recovering the solids content of the combined small particle overflow fractions.

4. A process as in claim 3 wherein the hydroclassifications produce two fractions, the particle size between the two fractions in each case being between about 150 and about 220 mesh.

5. A process as in claim 3 wherein the hydroclassifications produce two fractions, the particle size split between the two fractions being between about 150 and about 220 mesh, and wherein the solids content of the combined small particle fractions is recovered by filtering the solids from the aqueous slurry.

6. A process as in claim 3 wherein the small particle combined overflow fractions are subjected to a thickening operation and where the solids content of the combined fraction emerges from the thickening operation as an underflow from which the solids content is recovered.

7. A process of beneficiating the over-lap leached zone-phosphate matrix portion of the overburden of Florida pebble phosphate matrix which comprises slurrying said material with water, separating the pebble from the slurry, subjecting the pebble-free slurry to hydroclassification to separate a large particle size fraction for beneficiation, recovering a small particle size fraction as overflow from the hydroclassification whose particles are smaller than about 200 mesh, and subjecting the small particle size fraction to a thickening operation to recover a slurry constituting largely —200 mesh material as under-flow.

References Cited in the file of this patent
UNITED STATES PATENTS

| | | |
|---|---|---|
| 2,550,829 | Le Baron | May 1, 1951 |
| 2,553,905 | Evans | May 22, 1951 |
| 2,571,866 | Greene | Oct. 16, 1951 |